US012686994B2

(12) United States Patent
Cliff

(10) Patent No.: US 12,686,994 B2
(45) Date of Patent: *Jul. 21, 2026

(54) PREHEATING INTELLIGENCE FOR ELECTRIC-HYDRAULIC WORK VEHICLES

(71) Applicant: Deere & Company, Moline, IL (US)

(72) Inventor: Michael J. Cliff, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/638,516

(22) Filed: Apr. 17, 2024

(65) Prior Publication Data

US 2024/0263423 A1     Aug. 8, 2024

Related U.S. Application Data

(63) Continuation of application No. 17/178,891, filed on Feb. 18, 2021, now Pat. No. 12,024,860.

(51) Int. Cl.
*E02F 9/20* (2006.01)
*B60L 53/00* (2019.01)
(Continued)

(52) U.S. Cl.
CPC ............ *E02F 9/2095* (2013.01); *B60L 53/00* (2019.02); *E02F 9/16* (2013.01); *E02F 9/2058* (2013.01);
(Continued)

(58) Field of Classification Search
CPC ........ B60L 1/003; B60L 1/02; B60L 2200/40; B60L 2240/34; B60L 2240/36;
(Continued)

(56) References Cited

U.S. PATENT DOCUMENTS 9,291,256 B2   3/2016   Bidner et al.
11,764,598 B2   9/2023   Oetken
(Continued)

FOREIGN PATENT DOCUMENTS

CN   104709275 A   6/2015
CN   104947734 A   9/2015
(Continued)

OTHER PUBLICATIONS

German Search Report issued in application No. DE102022200161.3 dated Mar. 16, 2023 (08 pages).
(Continued)

*Primary Examiner* — Tyler J Lee
(74) *Attorney, Agent, or Firm* — KLINTWORTH & ROZENBLAT LLP

(57) ABSTRACT

An intelligent work vehicle preheating system includes an electric drive subsystem containing a battery pack, a hydraulic subsystem containing a first hydraulic fluid (HF) heating device, and a first HF temperature sensor. A memory stores a first minimum target temperature at or above which a first hydraulic fluid body contained in the hydraulic subsystem is desirably maintained. A controller architecture selectively places the intelligent work vehicle preheating system in an off-duty preheat mode when a the electric drive subsystem is connected to an external power supply utilized to charge the battery pack. The controller architecture further controls the HF heating device to heat the first hydraulic fluid body when (i) the intelligent work vehicle preheating system is placed in the off-duty preheat mode, and (ii) the current temperature of the first hydraulic fluid body is less than the first minimum target temperature.

28 Claims, 5 Drawing Sheets

(51) Int. Cl.

| | |
|---|---|
| *E02F 9/16* | (2006.01) |
| *E02F 9/22* | (2006.01) |
| *E02F 9/26* | (2006.01) |
| *F16H 57/04* | (2010.01) |
| *F16H 57/02* | (2012.01) |

(52) U.S. Cl.
CPC .......... *E02F 9/2091* (2013.01); *E02F 9/2264* (2013.01); *E02F 9/26* (2013.01); *B60L 2200/40* (2013.01); *F16H 57/02* (2013.01); *F16H 2057/02052* (2013.01); *F16H 57/0415* (2013.01)

(58) Field of Classification Search
CPC .... B60Y 2200/415; E02F 9/16; E02F 9/2058; E02F 9/207; E02F 9/2091; F16H 57/02; F16H 57/0413; F16H 57/0415
See application file for complete search history.

(56) References Cited

U.S. PATENT DOCUMENTS

| | | | |
|---|---|---|---|
| 2013/0051912 A1 | 2/2013 | Buschmann et al. | |
| 2014/0114515 A1* | 4/2014 | Porras ................... | B60W 20/00 |
| | | | 903/930 |
| 2018/0178615 A1* | 6/2018 | Xia ..................... | H01M 10/486 |
| 2021/0023950 A1 | 1/2021 | Clowes et al. | |
| 2022/0259825 A1 | 8/2022 | Cliff | |
| 2023/0151584 A1 | 5/2023 | Andreuccetti et al. | |

FOREIGN PATENT DOCUMENTS

| | | | |
|---|---|---|---|
| CN | 109787345 | A | 5/2019 |
| CN | 110273446 | A | 9/2019 |
| DE | 10151713 | B4 | 5/2007 |
| DE | 102011108188 | A1 | 2/2012 |
| DE | 102020213606 | A1 | 11/2021 |
| DE | 102020212968 | A1 | 4/2022 |
| EP | 3061873 | A1 | 8/2016 |
| EP | 3686353 | A1 | 7/2020 |
| EP | 3741608 | A1 | 11/2020 |
| FR | 2745759 | A1 | 6/2000 |
| FR | 2966389 | A1 | 11/2012 |
| FR | 2966388 | A1 | 4/2013 |
| GB | 2585970 | A | 1/2021 |
| JP | 2000074011 | A | 3/2000 |
| JP | 2006307950 | A | 10/2011 |
| JP | 2017115502 | A | 10/2019 |
| KR | 19980053869 | U | 10/1998 |
| KR | 20130057464 | A | 5/2013 |
| KR | 20130083728 | A | 7/2013 |

OTHER PUBLICATIONS

Phillips & Temro, Product & Application Guide. Eden Prairie, MN 55344, dated 2021, pp. 1-180.

* cited by examiner

PREHEATING INTELLIGENCE FOR ELECTRIC-HYDRAULIC WORK VEHICLES

CROSS-REFERENCE TO RELATED APPLICATION(S)

This application is a continuation of U.S. application Ser. No. 17/178,891, filed Feb. 18, 2021, now allowed.

STATEMENT OF FEDERALLY SPONSORED RESEARCH OR DEVELOPMENT

Not applicable.

FIELD OF THE DISCLOSURE

This disclosure relates to systems and methods for strategically preheating fluids within electric-hydraulic work vehicles to, for example, better conserve battery energy stores for powering non-heating functions during on-duty work vehicle operation.

BACKGROUND OF THE DISCLOSURE

Work vehicles are commonly equipped with sizable hydraulic systems, which aid in lifting and manipulating heavy loads, carrying-out demolition and digging actions, and performing other energy-demanding tasks during work vehicle operation. Examples of work vehicles equipped with robust hydraulic systems include loaders of various types, excavators, log skidders, tractors, and other vehicles employed in the construction, mining, agriculture, and forestry industries. The hydraulic systems onboard such work vehicles often contain relatively large volumes of hydraulic fluid (e.g., upwards of 40 gallons or approximately 151 liters of oil), the pressurized flow of which is controlled to animate hydraulic cylinders, hydraulic motors, and other hydraulic actuators. In certain instances, work vehicles are further equipped with actively-lubricated axle and drivetrain gearbox assemblies through which oil or another liquid lubricant (also encompassed by the term "hydraulic fluid" herein) is circulated to provide continuous lubrication during work vehicle operation. Regardless of whether a hydraulic system onboard a particular work vehicle platform provides active lubrication functions, hydraulic actuation functions, or a combination of these functions, the hydraulic fluid within the system is ideally maintained within an elevated temperature range to promote efficiency and minimize energy losses.

SUMMARY OF THE DISCLOSURE

An intelligent work vehicle preheating system is deployed onboard an electric-hydraulic (E/H) work vehicle. In embodiments, the intelligent work vehicle preheating system includes an electric drive subsystem containing a battery pack, a hydraulic subsystem containing a first HF heating device, and a first HF temperature sensor configured to monitor a current temperature of a first hydraulic fluid body within the hydraulic subsystem. A computer-readable memory stores a first minimum target a temperature at or above which the first hydraulic fluid body is desirably maintained during operation of the E/H work vehicle. A controller architecture is coupled to the electric drive subsystem, to the HF heating device, to the first HF temperature sensor, and to the computer-readable memory. The controller architecture is configured to selectively place the intelligent work vehicle preheating system in an off-duty preheat mode when the electric drive subsystem is connected to an external power supply utilized to charge the battery pack. The controller architecture further controls the HF heating device to heat the first hydraulic fluid body when (i) the intelligent work vehicle preheating system is placed in the off-duty preheat mode, and (ii) the current temperature of the first hydraulic fluid body is less than the first minimum target temperature.

Methods carried out by a controller architecture included in an intelligent work vehicle preheating system are further disclosed. The controller architecture is deployed onboard an intelligent work vehicle preheating system equipped with an electric-hydraulic (E/H) work vehicle equipped with an electric drive subsystem containing a battery pack, a hydraulic subsystem, a hydraulic fluid (HF) temperature sensor configured to monitor a current temperature of a hydraulic fluid body within the hydraulic subsystem, and a computer-readable memory storing a minimum target temperature at or above which the hydraulic fluid body is desirably maintained during E/H work vehicle operation. The method includes the step or process of selectively placing, via the controller architecture, the intelligent work vehicle preheating system in an off-duty preheat mode when the electric drive subsystem is connected to an external power supply utilized to charge the battery pack. The method further includes the step or process of controlling an HF heating device to heat the hydraulic fluid body when (i) the intelligent work vehicle preheating system is placed in the off-duty preheat mode, and (ii) the current temperature of the first hydraulic fluid body is less than the minimum target temperature.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
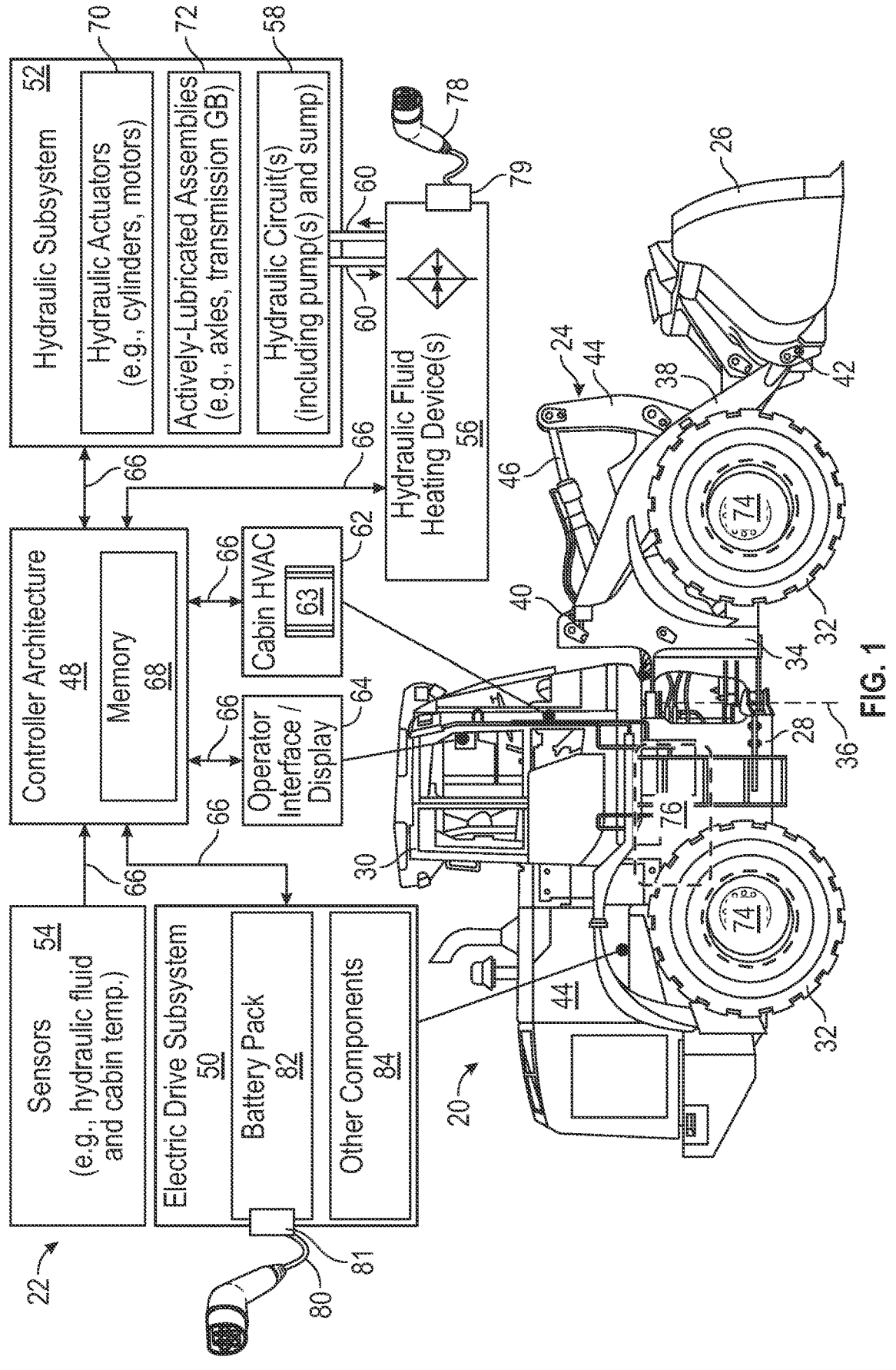
FIG. 1 is a side schematic of an electric-hydraulic (E/H) work vehicle (here, a wheel loader) equipped with an intelligent work vehicle preheating system, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims.

Overview

As noted above, certain work vehicles are equipped with relatively robust hydraulic systems utilized to power hydraulic actuators, to provide continual lubricant flow through actively-lubricated assemblies, or to provide both functions during work vehicle operation. Given their relative size and complexity, work vehicle hydraulic systems are often prime energy consumers onboard many work vehicle platforms. To minimize energy loses that may otherwise occur when hydraulic fluid bodies within a a hydraulic system are allowed to cool to low temperatures and become relatively viscous, work vehicle hydraulic systems typically seek to maintain hydraulic fluid temperatures within an elevated, optimal thermal range; e.g., often ranging from about 140 degrees Fahrenheit (° F.) or about 60 degrees Celsius (° C.) to about 160° F. or about 71° C. Maintaining hydraulic fluid temperatures within such a targeted thermal range optimizes hydraulic fluid viscosity to minimize energy losses otherwise occurring when forcing the flow of highly viscous or thick hydraulic fluid through restricted orifices and flow passages, while further ensuring the hydraulic fluid retains sufficient viscosity to perform its intended actuation or lubrication functions. Other benefits are also obtained by maintaining bodies of hydraulic fluid within such elevated, optimal thermal ranges, such as alleviating the stack-up of hydraulic fluid (that is, disparate accumulations of hydraulic fluid in different reservoirs or cavities) under cold start conditions, as pertinent in the case of lubricant sharing systems designed to circulate hydraulic fluid between a drivetrain gearbox and one or more actively-lubricated axle assemblies during work vehicle usage.

In the context of conventional, non-hybrid work vehicles powered utilizing an internal combustion engine, such as a heavy duty diesel engine, the energy expenditure devoted to heating hydraulic fluids during work vehicle operation is often of relatively little concern due, in part, to the high energy density of liquid petroleum fuels. Additionally, a certain degree of hydraulic fluid warming inherently occurs during work vehicle operation due to heat generation from fluid mechanics (e.g., sheering) as hydraulic fluid is conducted through a given hydraulic circuit and exchanged between different hydraulic components within the circuit. In the case of work vehicles possessing relatively large-volume hydraulic systems at least partially powered utilizing a battery pack (herein "electric-hydraulic work vehicle"), however, a significant fraction of energy stored within the pack battery may be expended to initially heat hydraulic fluid to its optimal or target thermal range, particularly under cold start conditions. Examples of such electric-hydraulic or "E/H" work vehicles include: (i) a hybrid work vehicle containing an internal combustion engine, an e-machine (functioning as both a motor and generator), and a hydraulic system driven utilizing battery power (e.g., via energization of the e-machine to operate one or more hydraulic a pumps) in at least some operational phases of the work vehicle; (ii) purely electric or "battery" work vehicles containing an electric motor (e.g., an e-machine capable of serving as a motor and generator), a battery module, and a hydraulic system including one or more pumps driven by the electric motor when drawing energy stores from the battery pack; and (iii) any other work vehicle containing a hydraulic system in which pressurized hydraulic flow is urged by one or more hydraulic pumps, which are principally or exclusively powered utilizing battery energy stores during at least some phases of E/H work vehicle operation. Further, in each of the cases above, the E/H work vehicle possesses a charging interface (e.g., socket or other connector) allowing connection of the work vehicle battery module to an external power supply, typically a regional power grid, utilizing a charging cable during off-duty phases of the work vehicle operating cycle.

Depending upon ambient temperatures, current hydraulic fluid temperatures, and other factors, an appreciable fraction of stored battery energy may be spent when heating hydraulic fluids during the initial phases of E/H work vehicle operation, particularly in the case of E/H work vehicles equipped with large volume hydraulic systems having capacities exceeding 29 gallons or approximately 110 liters and, in certain cases, having capacities approaching 40 gallons or approximately 151 liters. For example, and as further discussed below in the section entitled "EXAMPLE CALCULATIONS OF BATTERY STORAGE SAVINGS ACHIEVED THROUGH INTELLIGENT PREHEATING FUNCTIONS," greater than 10% of the chemical energy stores within a midrange battery pack may be expended in initially heating hydraulic fluid to optimal temperature ranges under cold start conditions (e.g., when ambient temperatures are near or below freezing) for an E/H work vehicle equipped with a large volume hydraulic system. Further, under such cold start conditions, additional chemical energy stores within the battery pack may further be spent to warm the cabin interior of an E/H work vehicle to temperatures adequate for operator comfort, although battery expenditures devoted to cabin heating are typically considerably less than those exhausted in heating hydraulic within the work vehicle hydraulic system to target thermal ranges. An going industrial demand consequently exists for systems and methods alleviating reliance on battery energy stores in heating hydraulic fluid bodies a within E/H work vehicles and, to a lesser extent, to reducing battery energy expenditures on work vehicle cabin heating.

In satisfaction of this ongoing industrial demand, the following describes systems and methods utilized in conjunction with E/H construction vehicles and other E/H work vehicles, which perform certain, strategically-applied preheating functions to better preserve battery energy stores in advance of on-duty usage of a given E/H work vehicle. Specifically, the presently-disclosed systems and methods leverage the greater (often, essentially limitless) electric power supply availed to the E/H work vehicle during charging from a vehicle-external power supply, such as a regional or nationwide power grid, to perform certain logic-based preheating functions. Such intelligent preheating functions include the anticipatory heating of one or more hydraulic fluid bodies, which are contained in any number of flow circuits within the hydraulic subsystem of an E/H work vehicle. The hydraulic fluid body or bodies may include any combination of transmission gearbox or drivetrain lubrication fluids, axle lubrication fluids, and hydraulic actuation fluids utilized to animate hydraulic motors, hydraulic cylinders, or other hydraulic actuators. Additionally, in at least some instances, the cabin of the E/H work vehicle may also be preheated to operator comfort levels when the intelligent work vehicle preheating system operates in an off-duty preheat mode prior to the on-duty usage phase of the work vehicle operating cycle. By virtue of this practice, optimal operation of the work vehicle hydraulic system can commence immediately upon disconnection of the host E/H work vehicle from its external power supply, while the need to expend valuable battery energy stores to rapidly ramp up hydraulic fluid (and possibly cabin) heating is mitigated to effectively extend the operational lifespan of the battery during ensuring on-duty usage of work vehicle.

From a systems-level perspective, embodiments of the intelligent work vehicle preheating system may include a processing subsystem or "controller architecture," a hydraulic subsystem, and an electrical drive subsystem containing a battery pack or module having a rechargeable chemistry. The hydraulic subsystem includes, in turn, a flow circuit containing at least one liquid body composed of oil or another hydraulic a fluid, at least one temperature sensor operably coupled to the controller architecture, and a heating device operably coupled to the controller architecture. During operation, the controller architecture determines the appropriate junctures during which to place the intelligent work vehicle preheating system in an intelligent, off-duty preheat mode based, at least in part, on whether the rechargeable battery pack is presently recharging from a vehicle-external power supply; e.g., a power transmission grid or other area-wide power supply having one or more terminals with which the intelligent work vehicle preheating system is connected utilizing, for example, an umbilical-type connector cable. When placed in the off-duty preheat mode, the controller architecture monitors a current temperature of the hydraulic fluid utilizing the temperature sensor and controls the heating device to selectively heat the hydraulic fluid when the current temperature of the hydraulic fluid is less than a minimum target temperature. In this manner, the intelligent work vehicle preheating system may maintain the current temperature of the hydraulic fluid at or near a target temperature (e.g., above the minimum value of optimal temperature range) until disconnection from the vehicle-external power supply, providing a sufficient time period is allotted to fully heat the hydraulic fluid bodies to a level at or above a minimum target temperature.

As indicated above, embodiments of the intelligent work vehicle preheating system may be deployed onboard an E/H work vehicle having a hydraulic system containing a relatively large volume of hydraulic fluid; e.g., a hydraulic system having a cumulative volumetric capacity exceeding 29 gallons or 110 liters of hydraulic fluid. The hydraulic fluid contained within the hydraulic subsystem integrated into a given E/H work vehicle may be provided as a single fluid body or, instead, as multiple bodies distributed across a number of fluidly-isolated flow circuits. In the latter regard, and by way of non-limiting example, a first body of hydraulic fluid may be contained within a first flow circuit and utilized for actuation purposes, with the first flow circuit containing flow lines, sumps or reservoirs, valving, and other such hydraulic features fluidly interconnecting the hydraulic fluid actuators to one or more pumps. Further, one or more additional bodies of hydraulic fluid may be located in a separate flow circuit and circulated through any number of actively-lubricated assemblies under the influence of one or more pumps during work vehicle operation. Such actively-lubricated assemblies may include a transmission gearbox (synonymous with the term "drivetrain gearbox"

herein), an actively-lubricated front axle assembly, and an actively-lubricated rear axle assembly in embodiments.

Varying levels of computer-implemented intelligence or logic can be introduced into the intelligent work vehicle preheating system for strategically carrying-out one or more preheating function when the preheating system operates in the off-duty preheat mode. In at least some implementations, preheating logic executed by the controller architecture of the intelligent work vehicle preheating system may commence preheating of the hydraulic fluid utilizing a schedule-based approach to prevent unneeded energy expenditure over extended or prolonged off-duty periods of an E/H work vehicle. For example, in such implementations, the processor architecture may determine an earliest anticipated start (EAS) time (the beginning of an operational window) and commence hydraulic fluid preheating at a time sufficiently prior to the EAS time to ensure that hydraulic fluid target temperatures are reached by the preestablished EAS time, possibly subject to other constraints, such as a minimum state of charge constraint discussed below. Further, the controller architecture may determine the EAS time based upon operator input or infer the EAS time from historical patterns of E/H work vehicle usage. The controller architecture of the intelligent preheating system may then establish an appropriate lead time at which to commence hydraulic fluid preheating, as back calculated from the EAS time, by recalling a fixed value from memory or utilizing a variable value factoring current hydraulic fluid temperatures, ambient temperature, and/or other sensor inputs.

In addition to or in lieu of the above-described scheduling-based approach, the controller architecture may also consider the current state of charge (SoC) of the battery pack when determining when to place the intelligent work vehicle preheating system in the off-duty preheat mode in embodiments. For example, in at least some implementations, the controller architecture may temporarily restrict or prevent the preheating functions when the SoC of the battery pack onboard the E/H work vehicle remains below a predetermined minimum charge level, such as 95% or 100% of the desired charge capacity of the battery pack. In this manner, battery pack recharge may be prioritized over preheating operations as prudent when, for example, the vehicle-external power supply has limited charging capabilities or there exists a likelihood that the off-duty charging period may be interrupted or abbreviated in some manner. In still further embodiments, neither of the above-described schedule-based or SoC-based preheating schemes may be employed, with the intelligent work vehicle preheating system providing the more straightforward approach of preheating the applicable hydraulic fluid body or bodies within the E/H work vehicle hydraulic system concurrently battery pack recharge from a vehicle-external power supply. Cabin preheating may also be regulated by such an intelligent work vehicle preheating system utilizing such control schemes and, when applicable, may be performed concurrently with or subsequent to hydraulic fluid preheating.

Additional description of an example intelligent work vehicle preheating system deployed onboard an E/H construction vehicle or other E/H work vehicle will now be discussed in connection with FIGS. 1-5. While the example intelligent work vehicle preheating system is principally described below in the context of a particular type of E/H construction vehicle (namely, an E/H wheel loader), embodiments of the intelligent work vehicle preheating system can be utilized onboard a wide range of E/H work vehicles employed in various industries. In this regard, embodiments of the intelligent work vehicle preheating system may be beneficially integrated into any E/H work vehicle containing hydraulic fluid desirably subject to preheating, including work vehicles equipped with sizable hydraulic systems having cumulative volumetric capacities exceeding about 110 liters or 29 gallons. A non-exhaustive list of work vehicles into which embodiments of the intelligent work vehicle preheating system may be usefully integrated includes work vehicles employed in construction and mining industries (e.g., backhoe loaders, front loaders, skid loaders, and excavators), in the agricultural industry (e.g., tractors), and in the forestry industry (e.g., log skidders and feller bunchers). Accordingly, the following description should be understood as merely providing a non-limiting example context in which embodiments of the present disclosure may be better understood.

Example Hydraulic Clutch Assembly Using Two Double Acting Pistons

Referring initially to FIG. 1, an E/H work vehicle (here, an E/H wheel loader 20) is equipped with an intelligent work vehicle preheating system 22 in accordance with an example embodiment of the present disclosure. In addition to the intelligent work vehicle preheating system 22, the example E/H wheel loader 20 includes a front end loader (FEL) assembly 24 terminating in a tool or implement, such a bucket 26. The FEL assembly 24 is mounted to a body or chassis 28 of the E/H wheel loader 20 and extends therefrom in a forward direction. A cabin 30 is located above a forward portion of the main chassis 28 and encloses an operator station containing a seat, operator controls, and other devices for piloting the E/H wheel loader 20, which include the below-discussed operator interface and display 64. The chassis 28 of the E/H wheel loader 20 is supported by front and rear pairs of ground-engaging wheels 32. In this particular example, the E/H wheel loader 20 has an articulated body such that a forward portion or a forward loader frame 34 of the E/H wheel loader 20 can rotate relative to the main chassis 28 about an upright axis 36.

The FEL assembly 24 of the E/H wheel loader 20 contains twin booms or lift arms 38, which extend from the forward loader frame 34 in a forward direction to the backside of the FEL bucket 26. At one end, each lift arm 38 is joined to the forward loader frame 34 of the wheel loader via a first pin or pivot joint 40. At a second, longitudinally-opposed end, each lift arm 38 is joined to the FEL bucket 26 via a second pin or pivot joint 42. Two lift arm cylinders (hidden from view) are further mounted between the forward loader frame 34 of the E/H wheel loader 20 and the lift arms 38. Extension of the lift arm cylinders results in rotation of the lift arms 38 about the pivot joints 40 and upward motion of the FEL bucket 26. The E/H wheel loader 20 also includes a bucket cylinder 46, which is mechanically coupled between the forward loader frame 34 and a linkage 44. A central portion of the linkage 44 is, in turn, rotatably or pivotally mounted between the lift arms 38, while an end portion of the linkage is pivotally joined to the FEL bucket 26 opposite the bucket cylinder 46. The linkage 44 may be a four-bar linkage, a Z-linkage, or a similar linkage suitable for converting translation of the bucket cylinder 46 into rotation (curling or uncurling) of the FEL bucket 26.

As schematically depicted in an upper portion of FIG. 1, the intelligent work vehicle preheating system 22 includes a controller architecture 48, an electric drive a subsystem 50, a hydraulic subsystem 52, and any number of sensors 54. One or more hydraulic fluid (HF) heating devices 56 are further included in the intelligent work vehicle preheating system 22 and may be fluidly coupled to a hydraulic circuit 58 contained in the hydraulic subsystem 52 by a network of flow line connections 60. Additionally, in embodiments in which the preheating system 22 provides a cabin preheating functionality by default or a user-selectable option, the intelligent work vehicle preheating system 22 may include or cooperate with a cabin Heating, Ventilation, and Air Conditioning (HVAC) subsystem 62 further provided onboard the E/H wheel loader 20. Among various other components, the HVAC subsystem 62 includes at least one cabin heating device 63, which may assume the form of a heat exchanger, a resistance heater, or any other device or component utilizable by the controller architecture 48 to selectively warm airflow (a fluid) provided to the interior of the wheel loader cabin 30. Finally, and as briefly noted above, the wheel loader 20 further contains an operator interface 64, which includes operator controls (e.g., buttons, switches, joysticks or control levers, pedals, a steering wheel, a touch screen interface, and so on) and at least one display device or monitor located within the cabin 30 enabling operators to view status information, input data, and otherwise control the E/H wheel loader 20 in the typical manner.

The connections between the controller architecture 48 and the various other components or subsystems 50, 52, 54, 56, 62, 64 of the intelligent work vehicle preheating system 22 are denoted by signal communication lines 66 in FIG. 1. The illustrated signal communication lines 66 may represent wireless connections, wired connections, flow line connections (when hydraulic control schemes are employed), or any combination thereof. Similarly, the controller architecture 48 of the intelligent work vehicle preheating system 22 can assume any form suitable for performing the functions described throughout this document. The term "controller architecture," as appearing herein, is utilized in a non-limiting sense to generally refer to the processing components of intelligent work vehicle preheating system 22. The controller architecture 48 can encompass or may be associated with any practical number of processors (central and graphical processing units), onboard control computers, navigational equipment pieces, computer-readable memories, power supplies, storage a devices, interface cards, and other standardized components. The controller architecture 48 of the intelligent work vehicle preheating system 22 may include or cooperate with any number of firmware and software programs or computer-readable instructions designed to carry-out the various process tasks, calculations, and control/display functions described herein.

The computer-readable instructions or code executed by the controller architecture 48 of the intelligent work vehicle preheating system 22 may be stored within a non-volatile sector of a computer-readable memory 68 associated with the controller architecture 48. While generically illustrated in FIG. 1 as a single block, the memory 68 can encompass any number and type of storage media suitable for storing computer-readable code or instructions, as well as other data utilized to support the operation of the intelligent work vehicle preheating system 22. The memory 68 may be integrated into the controller architecture 48 in embodiments as, for example, a system-in-package, a system-on-a-chip, or another type of microelectronic package or module. Other types of data may also be stored in the computer-readable memory 68 and utilized in performing the below-described intelligent preheating processes, such as data related to one or more optimal temperature ranges or minimal target temperatures at or above which one or more bodies of hydraulic fluid within the hydraulic subsystem 52 are desirably maintained, data indicating dates and times at which on-duty operation of the wheel loader 20 is anticipated, data specifying operator preferences pertinent to the preheating functionalities, and other such data items useful in carrying-out the processes and functions described herein.

With continued reference to FIG. 1, the hydraulic subsystem 52 can include any number and type of hydraulic actuators 70 and any number of actively-lubricated assemblies 72, which are fluidly interconnected by the hydraulic circuit 58. In the illustrated embodiment, specifically, the hydraulic subsystem 52 contains the above-described hydraulic cylinders 46 (bucket and lift cylinders) utilized to animated the FEL assembly 24, along with various other conventionally-known hydraulic components, such as valving, plumbing, hydraulic pumps, filters, hydraulic fluid conditioner devices (e.g., oil coolers), and the like. Similarly, the axle assemblies (generically represented by dashed circle graphics 74) connecting the front and rear wheel pairs 32 may be a lubricated by active, pump-driven hydraulic fluid flow during operation of the E/H wheel loader 20. So too may the various rotating components contained in the transmission or drivetrain gearbox (generically represented by dashed rectangle 76) be actively lubricated by continual hydraulic fluid flow. When provided, such actively-lubricated assemblies are encompassed by the generic block 72 appearing in the upper right of FIG. 1. In many instances, hydraulic fluid will not be exchanged between such actively-lubricated axle assemblies 74 and the transmission gearbox 76 with these actively-lubricated assemblies each fluidly coupled to a separate hydraulic flow circuit. In other instances, however, hydraulic fluid may be shared between actively-lubricated axle assemblies 74 (when provided) and the transmission gearbox 76 during operation of the E/H wheel loader 20. The cumulative volumetric capacity of the hydraulic subsystem 52 and the minimum target temperature (or temperatures) to which the hydraulic fluid bodies within the hydraulic subsystem 52 are desirably heated will vary among embodiments. However, in many instances, the hydraulic subsystem 52 of the E/H wheel loader 20 will have a volumetric capacity exceeding 110 liters (about 29 gallons), while the minimum target temperature or temperatures to which the hydraulic fluid bodies are heated will exceed 60° C. (about 140° F.), as further discussed below.

When placed in the below-discussed off-duty preheat mode, the intelligent work vehicle preheating system 22 can selectively apply heat input to a single hydraulic fluid body or, instead, may selectively apply heat input to multiple hydraulic fluid bodies contained in the hydraulic subsystem 52. For example, in certain embodiments, the intelligent work vehicle preheating system 22 may strategically preheat a single body of hydraulic fluid contained in a closed flow circuit including one or more sumps, flow lines, and other such features utilizing one or more HF heating devices 56. In this case, the hydraulic fluid body may be utilized for either actuation purposes (e.g., in the case of the E/H wheel loader 20, exchanged with the chambers of the hydraulic cylinders 46 to control cylinder stroke) or for active lubrication purposes; e.g., continually circulated through the axle assemblies 74, the transmission gearbox 76, and/or other actively-lubricated assemblies 72 onboard the E/H wheel loader. In other instances, the intelligent work vehicle preheating system 22 may selectively provide heat input to multiple hydraulic fluid bodies contained in a number of different, fluidly-isolated a hydraulic circuits within the hydraulic subsystem 52; e.g., the preheating system 22 may provide preheating of one or more hydraulic fluid bodies utilized for lubrication purposes, and one or more additional hydraulic fluid bodies utilized for actuation purposes.

Each hydraulic fluid body subject to preheating can be heated utilizing any number and type of HF heating devices 56. For example, in one approach, the hydraulic fluid body or bodies contained in the hydraulic subsystem 52 may each be heated utilizing a single in-line heating device 56. In this case, the in-line heating device 56 may be associated with (e.g., packaged with) a recirculation pump, which actively circulates hydraulic fluid through at least a portion of a given hydraulic circuit 58 (e.g., including the sump or sumps contained in the circuit 58) in conjunction with fluid preheating via the in-line heating device 56. Accordingly, in such embodiments, the hydraulic subsystem 52 may include a recirculation loop in which an HF heating device is positioned (also represented by box 58 in FIG. 1), and a recirculation pump coupled to the controller architecture 48 and further positioned in the recirculation loop. Further, the controller architecture 48 may operate the recirculation pump to circulate at least a portion of a hydraulic fluid body about the recirculation loop when simultaneously controlling the HF heating device(s) 56 to heat the hydraulic fluid body. Moreover, and as noted above, such HF heating devices 56 may be powered by connection to an external power supply (e.g., the power grid) via an umbilical-style power cable 78, which may be independent of a separate umbilical-style power cable 80 utilized to connect a battery pack 82 within the electric drive subsystem 50 in embodiments. Alternatively, both the battery pack 82 of the electrical drive subsystem 50 and the HF heating devices 56 may be connected to an external power supply via a single power cable or umbilical cord; e.g., the umbilical-style power cable 80 shown on the left of FIG. 1.

The power cables 78, 80 may be joined to vehicle-side charging terminals 79, 81, respectively, further included in the intelligent work vehicle preheating system 22, whether by plug-in connection of mating (e.g., male and female) connectors (in which case the power cables 78, 80 may be provided separate and apart from the E/H work vehicle 20) or in a more permanent manner such that the power cables 78, 80 remain a attached to the E/H work vehicle 20 during normal vehicle usage (in which case storage compartments may be provided onboard the E/H work vehicle 20 to store the power cables 78, 80 when not in use). Again, the secondary terminal 79 and its associated secondary power cable 78 need not be provided in all realizations of the intelligent work vehicle preheating system 22 and, more generally, E/H work vehicle 20; however, when provided, these electrical components may allow current supply to the HF heating device(s) 56, while bypassing the electric drive subsystem 50 to, for example, simplify integration and the wiring schemes utilized to adapt existing system designs to provide the intelligent preheating functions described herein.

In addition to the battery pack 82, the electric drive subsystem 50 contains other conventionally-known components commonly utilized in conjunction with a rechargeable battery pack to, for example, produce a battery module. Such components may include electrical components for regulating the rate at which the battery pack 82 charges during plug-in charging, for thermal regulation of the battery pack 82, for monitoring the health of the battery pack 82, for monitoring the current SoC of the battery pack 82, and for providing similar functions. The electric drive subsystem 50 also includes an e-machine capable of operating as an electric motor; and, perhaps, also capable of operating as a generator when back-driven to generate electrical current, as may be particularly applicable when the E/H wheel loader 20 assumes the form of a hybrid vehicle (rather than a pure electric or "battery" vehicle) further containing an internal combustion engine. Various other components 84 suitably contained in the electrical drive subsystem 50 include any number of control units (e.g., a power management unit, a battery control, and a motor/generator control unit when applicable), as well as a power distribution module. Finally, the battery pack 82 itself may also have any suitable rechargeable chemistry, such as a lithium ion chemistry or a nickel-cobalt-aluminum (NCA) chemistry. The term "battery pack," as appearing herein, is utilized in a broad sense to refer to any rechargeable battery apparatus or device, regardless of the number and type of individual cells contained therein.

Figure 2:
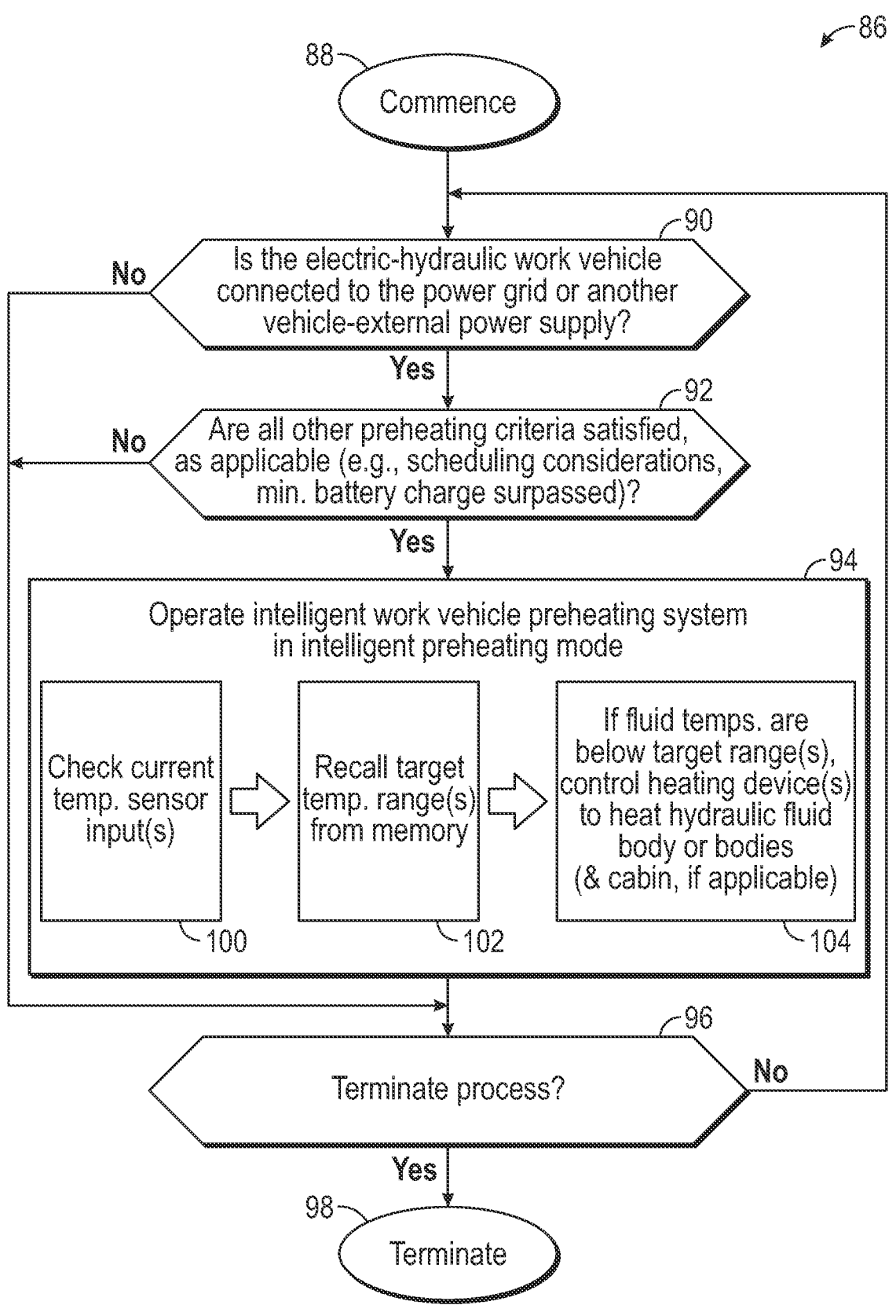
FIG. 2 is a flowchart setting forth an example method for strategically preheating hydraulic fluids within a work vehicle hydraulic system and potentially also preheating the interior of a work vehicle cabin, the method suitably carried out by the example intelligent work vehicle preheating system shown in FIG. 2.

Turning now to FIG. 2, an intelligent work vehicle preheating method 86 is set forth in accordance with an example embodiment of the present disclosure. For a purposes of explanation, the intelligent work vehicle preheating method 86 is described below as carried out by the intelligent work vehicle preheating system 22 onboard the E/H wheel loader 20 shown in FIG. 1. It will be appreciated, however, that alternative embodiments of the intelligent work vehicle preheating method 86 can be performed by other intelligent work vehicle preheating systems located onboard a wide range of E/H work vehicle platforms including, but not limited to, backhoe loaders, front loaders, skid loaders, and log skidders. The intelligent work vehicle preheating method 86 includes a number of process STEPS 88, 90, 92, 94, 96, 98, each of which is described, in turn, below. Further STEP 94 contains a number of SUBSTEPS 100, 102, 104 in the illustrated example, which are also described below. Depending upon the particular manner in which the intelligent work vehicle preheating method 86 is implemented, each step generically illustrated in FIG. 2 may entail a single process or multiple sub-processes. Further, the steps illustrated in FIG. 2 and described below are provided by way of non-limiting example only. In alternative embodiments of the intelligent work vehicle preheating method 86, additional process steps may be performed, certain steps may be omitted, and/or the illustrated process steps may be performed in alternative sequences.

The intelligent work vehicle preheating method 86 commences at STEP 88. Embodiments of the intelligent work vehicle preheating method 86 may commence in response to the receipt of operator input (e.g., as received via the operator interface 64 of the E/H wheel loader 20) activating the intelligent preheating function of the E/H wheel loader 20 or otherwise requesting performance of the method 86. After commencing (STEP 88), the controller architecture 48 of the intelligent work vehicle preheating system 22 advances to STEP 90 and determines whether the E/H wheel loader 20 is presently connected to an external power supply, such as the power grid. As noted above, such a connection may be established utilizing at least one power cable 78, 80, which is plugged into a suitable terminal on the E/H wheel loader 20 and/or in the surrounding charging infrastructure when the E/H wheel loader 20 is not in active use and is consequently off-duty. Appropriate charging interfaces or stations may be provided within storage bays or other structures utilized to temporarily house work vehicles when not in usage.

As noted above, a single power cable/vehicle-side terminal or multiple power cables/vehicle-side terminals 78-81 may be utilized to provide the desired power connections when applicable. Generally, the usage of a single power cable/vehicle-side 80, 81 terminal may streamline operator tasks by requiring only a single plug-in connection during charging of the E/H wheel loader 20 and, specifically, of the battery pack 82 within the electric drive subsystem 50. Comparatively, and as noted above, the provision of separate or independent power cables/vehicle-side terminals 78-81 may simplify power routing schemes for electrically powering the HF heating devices 56, while bypassing the electric drive subsystem 50 and/or by allowing the power cables 78, 80 to terminate in different connector types, to operate at different voltages (e.g., 120 volts and 240 volts), to operate utilizing alternating current or direct current, or to otherwise differ in design and capabilities. The controller architecture 48 may determine when the E/H wheel loader 20, and specifically, the battery pack 82, is connected to an external power supply by monitoring the SoC of the battery pack 82 or utilizing other sensors for monitoring electrical parameters (e.g., currents or voltages) within the electric drive subsystem 50.

If determining that the E/H wheel loader 20 is not currently electrically connected to an external power supply at STEP 90, the controller architecture 48 of the intelligent work vehicle preheating system 22 progresses to STEP 96 and determines whether the current iteration of the intelligent work vehicle preheating method 86 should terminate, as discussed below. Otherwise, the controller architecture 48 of the intelligent work vehicle preheating system 22 advances to STEP and determines whether all other preheating criteria are satisfied before placing the intelligent work vehicle preheating system 22 in the off-duty preheat mode (STEP 94). If determining that one or more of the criteria for entering the off-duty preheat mode are not satisfied during STEP 92 (when applicable), the controller architecture 48 again progresses to STEP 96 and determines whether the current iteration of the intelligent work vehicle preheating method 86 should terminate. Conversely, if determining that all additional preheating criteria or preconditions have been satisfied during STEP 92, the controller architecture 48 continues to STEP 94 and places the intelligent work vehicle preheating system 22 in the off-duty preheat mode. In this regard, any number and type of criteria (including a single criterion) may be considered during STEP 92 of the intelligent work vehicle preheating method 86, depending upon implementation specifics. For example, and as indicated in FIG. 2, either or both of two preheating criteria usefully considered in embodiments of the intelligent work vehicle preheating method 86 and pertain to schedule-based considerations and minimum battery SoC constraints.

Addressing first schedule-based considerations, the controller architecture 48 of the intelligent work vehicle preheating system 22 may strategically or selectively commence heating of the hydraulic fluid utilizing a schedule-based approach to prevent unneeded energy expenditure over prolonged off-duty periods of a given E/H work vehicle. In this case, the controller architecture 48 may determine an EAS time (the beginning of an operational window) and commence hydraulic fluid preheating at a time sufficiently prior to the EAS time to ensure that hydraulic fluid target temperatures are reached by the preestablished EAS time. In certain cases, the controller architecture 48 may determine the EAS time based upon operator input, while the appropriate lead time at which to commence the hydraulic fluid preheating is assigned a fixed value recalled from a computer-readable memory or, instead, is assigned a variable value based upon current hydraulic fluid temperatures, ambient temperature, or other sensor inputs, as received from the sensors 54. Stated differently, the controller architecture 48 may monitor a current SoC of the battery pack 82, while refraining from preheating the hydraulic fluid bodies (and the cabin 30 when applicable) when in the off-duty preheat mode until the current SoC of the battery pack surpasses a minimum SoC threshold stored in the memory 68. Additionally or alternatively, in the case of SoC-based considerations, the controller architecture 48 of the intelligent work vehicle preheating system 22 may consider the current SoC of the battery pack when operating in the off-duty preheat mode; and may commence hydraulic fluid preheating only when the SoC of the battery pack has surpassed a predetermined charge level, such as 95% or 100% of the desired charge capacity of the battery pack or module. Cabin preheating may also be regulated or controlled by such an intelligent work vehicle preheating system in a similar manner; and, in certain cases, may be performed concurrently with or subsequent to hydraulic fluid preheating. Further discussion in this regard is provided below in connection with FIGS. 3-5.

During STEP 94, the controller architecture 48 of the intelligent work vehicle preheating system 22 can perform any number of actions supporting the strategic preheating of one or more fluids onboard the E/H wheel loader 20. In the illustrated example, three SUBSTEPS 100, 102, 104 are carried out to ensure that one or more fluid bodies are heated toward (and ideally to) predefined target temperature or thermal ranges in preparation for the next or upcoming on-duty operation cycle of the E/H wheel loader 20. Accordingly, at SUBSTEP 100, the controller architecture 48 monitors the temperature sensor inputs, as provided by the onboard sensors 54 of the intelligent work vehicle preheating system 22. Generally, such inputs will include the current temperature of at least one body of hydraulic fluid subject to preheating. In certain cases, the current temperatures of multiple hydraulic fluid bodies may be monitored, whether to provide redundancy or to allow heating of different hydraulic fluid bodies to different target temperatures or temperature ranges, as discussed below. In embodiments in which cabin preheating is provided, the internal temperature of the cabin 30 may also be monitored utilizing a temperature sensor included in the onboard sensors 54. Any number of additional sensor inputs may also be monitored during SUBSTEP 100 when consumed as inputs in carrying-out alternative embodiments of the intelligent preheating system including, for example, sensor input indicative of current ambient temperatures.

Next, at SUBSTEP 102, the controller architecture 48 of the intelligent work vehicle preheating system 22 recalls the appropriate temperature data from the memory 68. For example, in embodiments, data indicative of a minimum target temperature for at least one hydraulic fluid body may be recalled from the memory 68. Such data may be expressed as an optimal temperature range, with the lower value representing a minimum target temperature at or above which a given hydraulic fluid body is maintained or multiple hydraulic fluid bodies are desirably maintained during work vehicle operation. In other instances, a single temperature value may be stored in the memory 68 for a given hydraulic fluid body or bodies and represent such a minimum target temperature. As a still further possibility, different minimum target temperatures may be established for different hydraulic fluid bodies when, for example, a disparate formulations of hydraulic fluid are contained in fluidly-isolated hydraulic circuits of the hydraulic subsystem 52; e.g., as may be the case when a first hydraulic circuit contains a first formulation of hydraulic fluid utilized for hydraulic actuation purposes, whiles a second hydraulic circuit contains a disparate formulation of hydraulic fluid utilized for active lubrication purposes. When the cabin 30 of the E/H wheel loader 20 is also potentially subject to preheating, temperature data specifying a desired minimum cabin temperature may also be recalled from the memory 68 during SUBSTEP 102; and compared to a current cabin temperature to determine when the airflow supplied to the cabin interior is desirably heated utilizing the cabin heating device 63. Any or all stored temperature values may be programmed into the memory 68 by default and may or may not be adjustable after original equipment manufacture; e.g., in embodiments, the stored target temperature values (particularly the cabin temperature value) may be adjustable to operator preference and/or the stored target temperature values may be adjustable by technicians to fine tune the operation of the hydraulic subsystem 52 during maintenance or repair procedures.

Finally, at SUBSTEP 104, the controller architecture 48 controls the HF heating devices 56 to apply heat input to the pertinent hydraulic fluid bodies within the hydraulic subsystem 52 and/or to the airflow supplied to the operator cabin 30 via the cabin HVAC subsystem 62, as appropriate. Specifically, in the case of one or more bodies of hydraulic fluid, the controller architecture 48 controls the appropriate HF heating devices 56 to warm one or more hydraulic fluid bodies when determining from the temperature sensor input that the current temperature of the hydraulic fluid bodies is less than the minimum target temperature or temperatures recalled from the memory 68 during SUBSTEP 102. In this manner, the intelligent work vehicle preheating system 22 increases the temperature of the hydraulic fluid bodies toward the minimum target temperature (or temperatures if multiple different, hydraulic fluid body-specific target temperatures are utilized) as the intelligent work vehicle preheating system 22 operates in the off-duty preheat mode; and, providing a sufficient duration of time is afforded until the E/H wheel loader 20 is again disconnected from the vehicle-external power supply, the intelligent work vehicle preheating system 22 will ultimately raise the hydraulic fluid temperatures to levels at or slightly above the minimum target a temperature or temperatures.

Following this, if the E/H wheel loader 20 remains connected to the vehicle-external power supply, the intelligent work vehicle preheating system 22 continues to monitor the relevant hydraulic fluid temperatures and controls the HF heating devices 56, as needed, to selectively apply heat input (or to provide varying levels of heat input) to maintain the hydraulic fluid temperatures above the minimum target temperatures specified in the memory 68. As noted previously, recirculation pumps (e.g., potentially packaged with the HF heating devices 56) may be activated concurrently with preheating to promote a more homogenous temperature distribution across a given hydraulic circuit. Here, it is noted that some portions of hydraulic fluid within a given hydraulic circuit may be located in flow lines connected to hydraulic actuators or contained within hydraulic actuators and not be subject to direct heating and circulation during the preheating process. Such stagnant hydraulic fluid, however, will typically represent only a small fraction of the total volume of hydraulic fluid within a given hydraulic circuit and, thus, does not materially detract from the benefits gained by performing the preheating functions described herein.

A similar approach may likewise employed in preheating the cabin 30 of the E/H wheel loader 20, with the controller architecture 48 commanding the cabin HVAC subsystem 62 to heat airflow supplied to the cabin 30 when the internal cabin temperature is below a target minimum temperature specified in the computer-readable memory 68. In other instances, preheating of the cabin 30 may not be provided or, instead, may be deprioritized such that cabin preheating occurs only subsequent to preheating of the hydraulic fluid body or bodies within the hydraulic subsystem 52 to levels at or above the specified minimum target temperature(s). When applicable, the minimum cabin preheating temperature may be adjustable to operator preference by, for example, interactions with a GUI setting pages generated on an in-cabin display included in the operator interface and display 64 of the E/H wheel loader 20. Additionally, in embodiments, an operator may interact with such a GUI to selectively activate or deactivate the cabin preheating function or otherwise adjust operational aspects of the intelligent work vehicle preheating system 22 to preference. An operator may further utilize such a GUI interface to specify dates and times defining a expected operational windows of the E/H wheel loader 20 as useful when, for example, the controller architecture 48 applies a schedule-based preheating scheme in which preheating is initiated at least partly based on a daily EAS time, as further discussed below in connection with FIGS. 4 and 5.

Advancing to STEP 96, the controller architecture 48 of the intelligent work vehicle preheating system 22 next determines whether the current iteration of the intelligent work vehicle preheating method 86 should terminate. If determining this to be the case, the controller architecture 48 progress to STEP 98 and terminates the intelligent work vehicle preheating method 86 accordingly. This effectively places the intelligent work vehicle preheating system 22 in a default or standard operation mode in which fluidic heating may still applied to the thermally-regulated hydraulic fluid bodies on an as-needed basis. Otherwise, the controller architecture 48 returns to STEP 90 and the above-described process steps repeat or loop. By performing the intelligent work vehicle preheating method 86 on a relatively rapid (e.g., real time or near real time) basis, the controller architecture 48 strategically preheats the pertinent hydraulic fluid bodies towards or to target temperatures in advance of on-duty usage of the E/H wheel loader. Optimal operation of the hydraulic subsystem 52 can commence immediately upon disconnection of the E/H wheel loader 20 from its external power supply, while the need to expend valuable battery energy stores on hydraulic fluid (and possibly cabin) heating is mitigated to effectively extend the operational lifespan of the battery pack 82 during on-duty (e.g., battery operated) usage of the of the E/H wheel loader 20.

Figure 3:
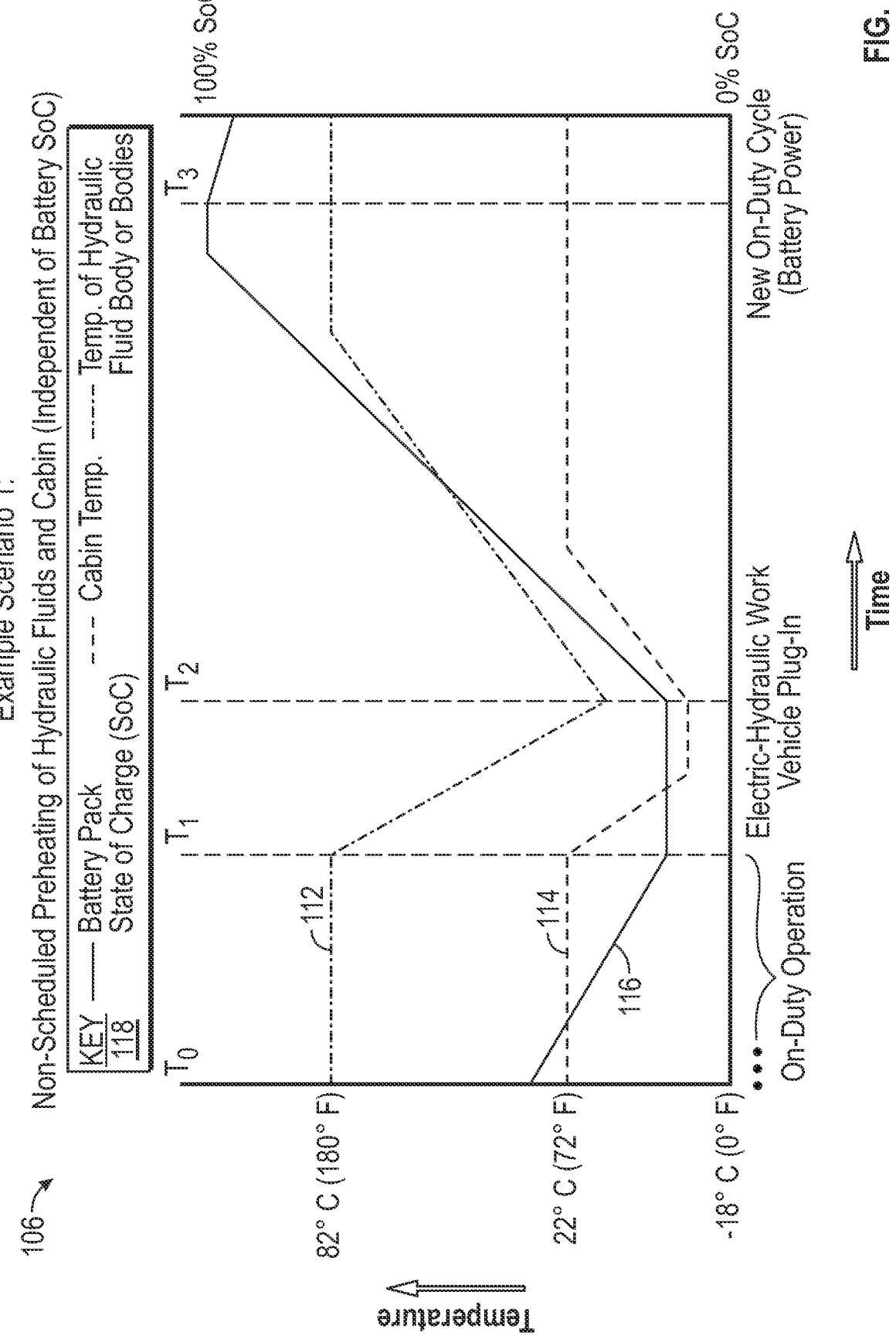
FIGS. 3-5 are graphs illustrating different intelligent or logic-based preheating schemes, which can be implemented by the intelligent work vehicle preheating system when performing the example method set forth in FIG. 2 in embodiments.
Figure 4:
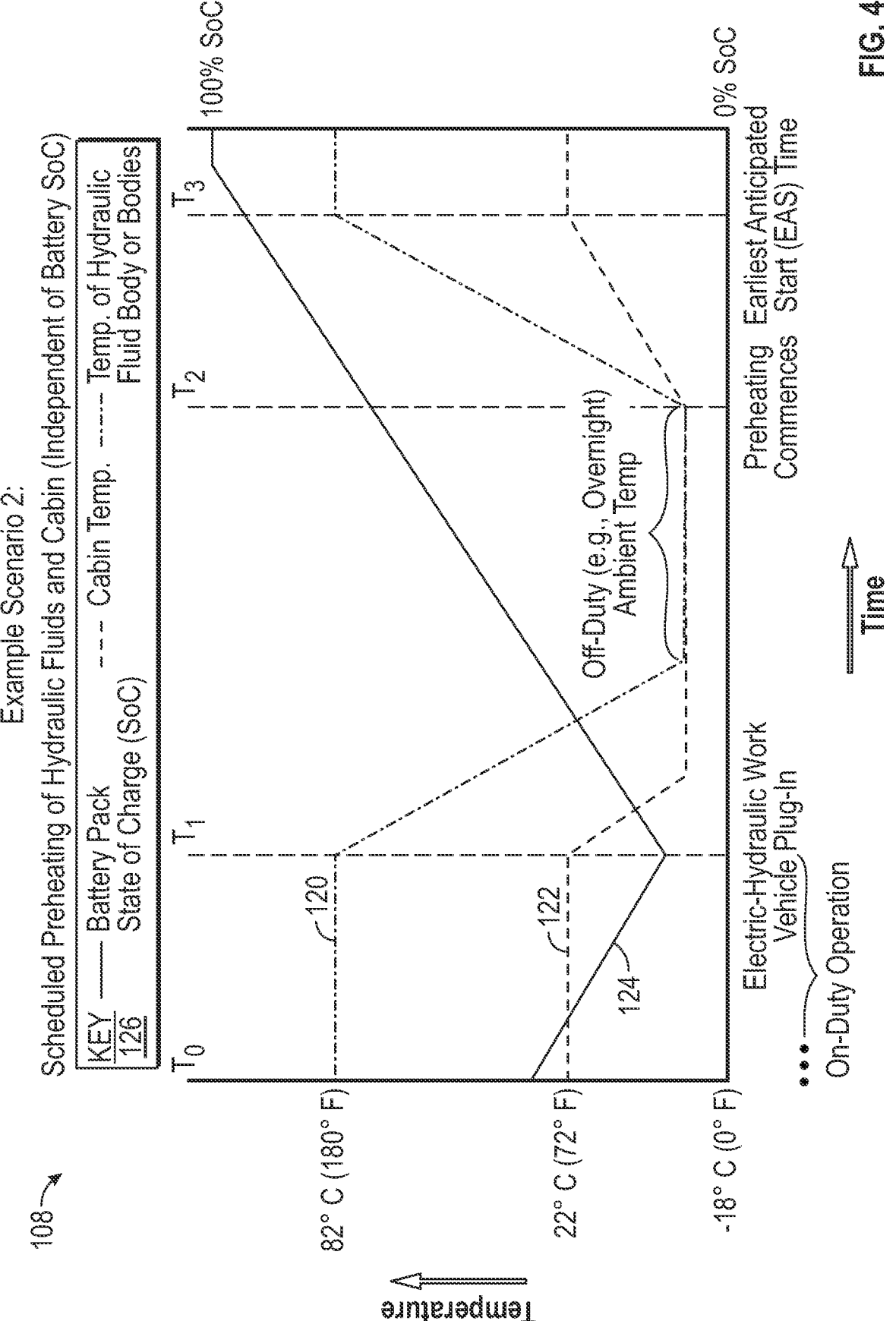
Figure 5:
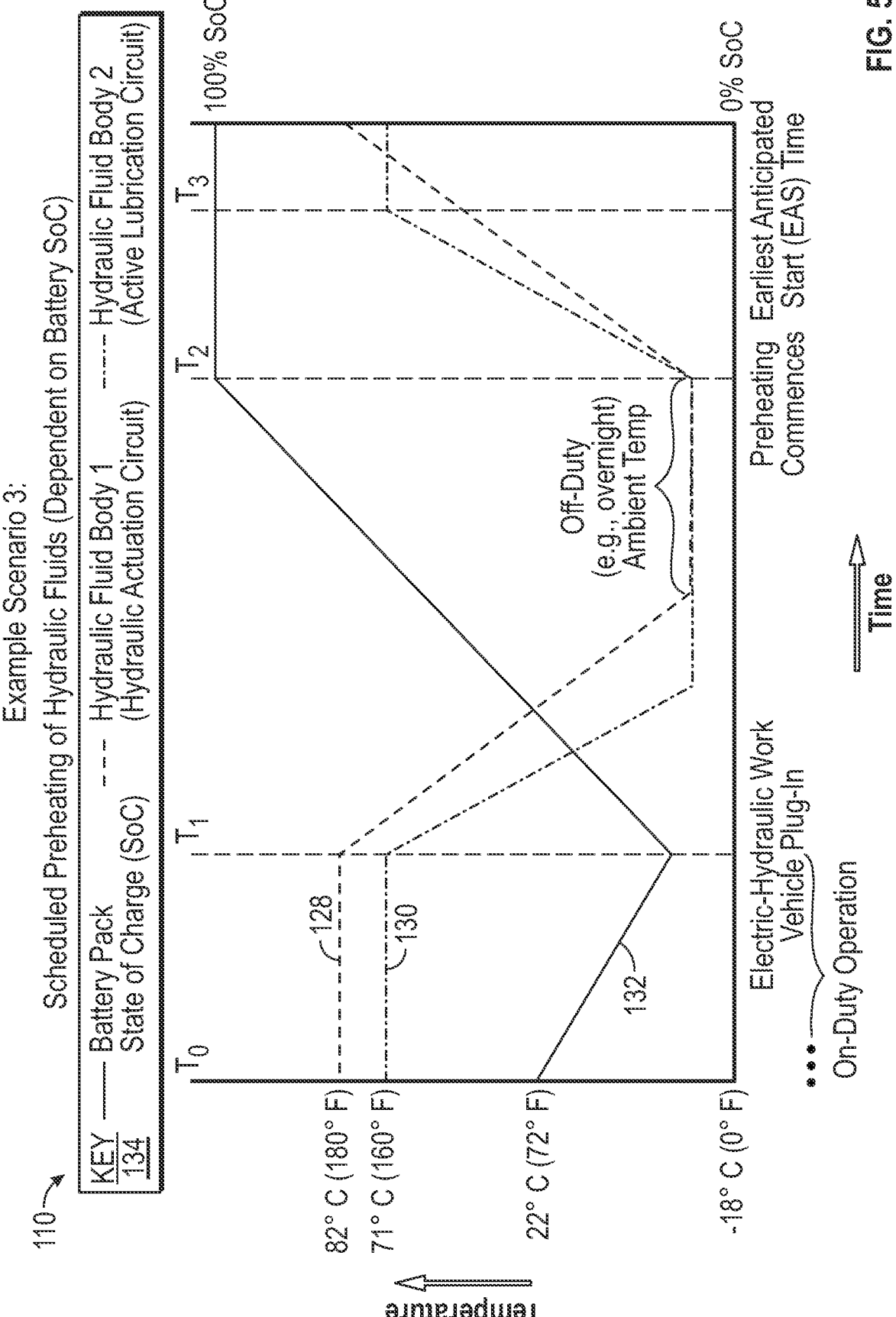

FIGS. 3-5 are graphs illustrating different intelligent heating schemes potentially carried out potentially implemented by the intelligent work vehicle preheating system 22 (FIG. 1) when carrying-out the example intelligent work vehicle preheating method 86 (FIG. 2). In each of the example graphs 106, 108, 110 presented in FIGS. 3, 4, and 5, the time component is plotted along the horizontal axis, with the passage of time occurring in a left to right direction. Comparatively, temperature is plotted along the left vertical axis, with temperature increasing in an upward direction. Finally, the state of charge or "SoC" of the E/H work vehicle battery pack (e.g., the battery pack 82 of E/H wheel loader 20) is plotted along the right vertical axis and a ranges from 0% to 100% SoC, with the SoC values again increasing in an upward direction. In embodiments, the SoC percentages may represent absolute values such that the battery pack 82 in incapable of retaining charge above 100% SoC or cannot supply further discharge below 0% SoC. Alternatively, the illustrated SoC percentages may present optimized values such that, for example, the battery pack 82 can be charged above 100% SoC, but is ideally not charged above this value to better maintain battery health and lifespan.

Addressing first graph 106 shown in FIG. 3, an example preheating scheme in which hydraulic fluid contained within the hydraulic system 52 and the interior of the wheel loader cabin 30 are subject to preheating, as applied independently of time-based scheduling or the current battery pack SoC. The graph 106 plots three traces 112, 114, 116, which are identified by a key 118 appearing in an upper portion of this drawing figure. The example scenario begins at timepoint T0, which occurs at a more-or-less arbitrary point during on-duty operation of the E/H wheel loader 20. At timepoint TO, the hydraulic fluid within the hydraulic subsystem 52 (distributed as one or more hydraulic fluid bodies) is at an optimal temperature of about 82° C. (180° F.), while the interior of the cabin 30 is at an operator comfort level of about 22° C. (72° F.).

Approximately one third of the energy stored within the battery pack 82 remains at timepoint T0 and continues to diminish until the E/H wheel loader 20 is shutdown at timepoint T1. In the illustrated example, a duration of time passes from shutdown (or off-duty usage) of the E/H wheel loader 20 (timepoint T1) until the E/H wheel loader 20 is connected to a vehicle-external power supply, such as the power grid, via the connector cable or cables 78, 80. The ambient temperature in the present example is at or slightly below freezing (0° C. or 32° F.) such that, during this duration of time (from timepoint T1 to T2), the hydraulic fluid temperature (trace 112) and the cabin temperature (trace 114) each decrease toward the ambient temperatures until the intelligent work vehicle preheating system 22 commencing preheating at timepoint T2.

As just noted, the intelligent work vehicle preheating system 22 commences preheating of the hydraulic fluid and the cabin interior at timepoint T2. The intelligent work vehicle preheating system 22 enters the preheat mode independently of the current SoC of the battery pack 82 and any EAS time considerations in this example, a commencing preheating of the hydraulic fluid and the cabin interior at timepoint T2 solely in response to connection of the E/H wheel loader 20 to an external power supply. As indicated by the graph 106, the intelligent work vehicle preheating system 22 concurrently applies heat input to both the hydraulic fluid within the hydraulic subsystem 52 (trace 112) and the cabin interior (trace 114) in conjunction with charging of the battery pack 82 (trace 116). Further, the preheating system 22 controls the hydraulic fluid heating device(s) 56 to apply heat to the hydraulic fluid body or bodies until reaching the optimal or target temperature, here 82° C. (180° F.). Following this, the preheating system 22 applies additional heat input on an as-needed basis to maintain the hydraulic fluid temperature at or slightly above this optimal minimum temperature. Similarly, the preheating system 22 commands the cabin HVAC subsystem 62 to heat the interior of the cabin 30 until reaching the operator comfort level of about 22° C. (72° F.), which may be a default value recalled from the memory 68 or set to operator preference. The battery pack 82 is concurrently charged in typical fashion until reaching an optimized 100% SoC value. Subsequently, at timepoint T3, the E/H wheel loader 20 is disconnected from the battery-external power supply and again enters an on-duty usage cycle drawing energy from the battery pack 82. Notably, at timepoint T3, the battery pack 82 is fully charged, the hydraulic fluid body or bodies within the hydraulic subsystem 52 have been heated to an optimal temperature, and the cabin interior is warmed to operator comfort levels. Consequently, little to no energy stores from the recently-charged battery pack 82 need to be expended on heating hydraulic fluid or the cabin interior, including under the cold start conditions in the example scenario.

Turning to the second graph 108 shown in FIG. 4, a schedule-based, battery SoC-independent preheating scheme potentially applied by the intelligent work vehicle preheating system 22 is graphically presented. As was previously the case, three traces 120, 122, 124 are plotted representing the battery pack SoC, cabin temperature, and hydraulic fluid temperature, respectively. Again, at time-point T0, the hydraulic fluid within the hydraulic subsystem 52 is maintained at an optimal temperature of 82° C. or 180° F. (trace 120), the interior of the cabin 30 is maintained an operator comfort level of 22° C. or 72° F. (trace 122), and approximately one third of the energy stored within the battery pack 82 remains (trace 124). In the example of FIG. 4, E/H wheel loader shutdown/off-duty usage and plug-in occur substantially concurrently at timepoint T1, with battery pack recharging also commencing at this time. However, as can be seen, preheating of the hydraulic fluids within the hydraulic subsystem 52 and the interior of cabin 30 does not commence until timepoint T2, with the hydraulic fluid and cabin interior temperatures allowed to cool and potentially equalize with the relatively cold ambient temperatures in this example. At timepoint T2, the controller architecture 48 commences concurrent heating of the hydraulic fluid (trace 120) and the cabin interior (trace 122), gradually heating the pertinent fluids (hydraulic fluid and the airflow provided to the cabin 30) until reaching their respective target temperatures at timepoint T3. As indicated above in connection with the intelligent work vehicle preheating method 86 (FIG. 2), timepoint T3 is set at the Earliest Anticipated Start (EAS) time of the E/H wheel loader 20 in the present example. The controller architecture 48 thus determines the appropriate juncture at which to commence preheating of the hydraulic fluids and the cabin interior (timepoint T2) by subtracting a duration of time required to perform adequate preheating of the hydraulic fluids and the cabin interior from the EAS time (timepoint T3); and, ideally, an adequate duration of time to fully heat the hydraulic fluid body or bodies to their optimal target temperatures (here, 180° F. or 82° C.) and, of lesser importance, an adequate duration of time to fully heat the cabin interior to the desired operator comfort level (here, 72° F. or 22° C.).

Accordingly, in the preheating scheme graphically expressed in FIG. 4, the controller architecture 48 performs measures ensuring that hydraulic fluid within the hydraulic subsystem 52 and the cabin interior are fully preheated by the EAS time, while avoiding unneeded energy expenditure in preheating the hydraulic fluid and the cabin interior over the entire off-duty phase of the E/H wheel loader 20 (timepoint T1 to timepoint T2). By referring to timepoint T3 in the graph 108 of FIG. 4, it may further be appreciated that preheating of the hydraulic fluid and the cabin interior commences prior full charging of the battery pack 82 and, perhaps, entirely independently of the battery pack SoC level. In other embodiments, the preheating functions of the a intelligent work vehicle preheating system 22 may be dependent upon or tied to the SoC of the battery pack 82. Consider, in this regard, the third graph 110 shown in FIG. 5 and plotting three traces 128, 130, 132. The first trace 128 denotes the temperature of a first hydraulic body (e.g., hydraulic fluid contained in an actuation flow circuit, such as the flow circuit in which the cylinders 46 of the E/H wheel loader 20 are positioned). The second trace 130 is representative of the temperature of a second hydraulic body (e.g., hydraulic fluid contained in a lubrication flow circuit, such as the flow circuit in which the actively-lubricated assemblies 72 of the E/H wheel loader 20 are positioned). The third trace 132 represents the internal temperature of the cabin 30. The intelligent work vehicle preheating system 22 does not provide cabin preheating in this example and, thus, a trace is not plotted on the graph 110 for cabin temperature. This stated, the intelligent work vehicle preheating system 22 can readily provide cabin preheating in addition to the preheating of any number of hydraulic fluid bodies in further implementations.

The example of FIG. 5 is provided to illustrate at least two potential aspects of the intelligent preheating scheme employed by embodiments the intelligent work vehicle preheating system 22. First, the preheating functions of the intelligent work vehicle preheating system 22 may be dependent upon the SoC of the battery pack 82 in embodiments. In the instant example, specifically, preheating of the hydraulic fluid bodies within the hydraulic subsystem 52 is constrained by both time (schedule-based restrictions) and battery pack SoC. With respect to schedule-based constraints, the above-discussed approach in commencing preheating prior to an EAS time is again employed. However, in this particular example, the time at which preheating commences (timepoint T2 in FIG. 5) is paused or held in abeyance until the battery pack SoC reaches a predetermined minimum threshold. In embodiments, the predetermined minimum threshold may range from 90% to 100% SoC, inclusive. In other embodiments, the predetermined minimum SoC threshold may be less than the aforementioned range. In this manner, battery pack recharge is prioritized over the preheating functions, noting that the temperature of the first hydraulic fluid body (trace 128) is unable to fully reach its target temperature of about 82° C. (180° F.) prior to the EAS time and, thus, continues to be warmed by the preheating system 22 following a timepoint T3. Second, the example plotted in the graph 110 of FIG. 5 denotes that different hydraulic fluid bodies can readily be preheated to different target temperatures or temperature ranges in embodiments. In the illustrated embodiment, the first hydraulic fluid body (trace 128) is subject to preheating until reaching a target minimum temperature of about 82° C. (180° F.) or until on-duty operation of the E/H wheel loader 20 recommences, while the second hydraulic fluid body (trace 130) is subject to preheating until reaching a lower target minimum temperature of about 72° C. (160° F.) or until on-duty operation of the E/H wheel loader 20 recommences. In other instances, the intelligent work vehicle preheating system 22 may instead preheat all pertinent hydraulic fluid bodies to a uniform minimum temperature.

Example Calculations of Battery Storage Savings Achieved Through Intelligent Preheating Functions Application of the above-described intelligent preheating schemes may save varying amounts of battery energy stores for non-heating usage during on-duty operation of a particular E/H work vehicle depending upon multiple factors. Such factors include ambient temperatures, battery pack storage capabilities, and the physical characteristics of the hydraulic system onboard the E/H work vehicle. However, by way of non-limiting illustration, an example scenario may be considered in which an E/H work vehicle is equipped with a hydraulic subsystem holding about 143 liters (38 gallons) of oil; e.g., distributed as a 113 liter (30 gallon) body of oil used for actuation purposes and a 30 liter (about 8 gallon) body of oil utilized for drivetrain lubrication purposes. Assume further that the oil bodies each contain the same or similar oil formulations, which possess a density (rho) of about 7.3 pounds per gallon or about 875 kilograms per cubic meter and which has a pressure coefficient (Cp) of about 2 kilojoules/kilograms kelvin. Should the oil within the hydraulic subsystem reach ambient temperatures, which may be about 0.5° C., 33° F., or 273.7 kelvin (K) as an example, when the E/H work vehicle is off-duty and not actively utilized, approximately 16,362 kilojoules of energy in the form of heat input is required to return the hydraulic fluid bodies to a target temperature of 338.7 K (about 150° F.). In the case of a medium range battery pack having a storage capacity of about 45 kilowatt hours (kWh), as an example, this quantity constitutes about 10% of total battery energy stores expended purely to ramp-up hydraulic fluid temperatures under cold start conditions. By avoiding such initial battery energy expenditures, then, the battery energy stores available for non-heating functions during the ensuring on-duty usage of the E/H work vehicle is boosted by an equivalent amount. Further, component wear and tear may be reduced by ensuring that hydraulic fluids are heated to optimal temperatures immediately upon on-duty usage of an E/H work vehicle. Finally, additional savings of stored battery energy, which is better preserved for usage in non-heating applications or functions, is also be achieved in instances in which the intelligent work vehicle preheating system provides preheating of the interior of a cabin in the manner described above.

Enumerated Examples of Intelligent Work Vehicle Preheating Systems

The following examples of intelligent work vehicle preheating systems are further provided and numbered for ease of reference.

1. In an example embodiment, an intelligent work vehicle preheating system onboard an E/H work vehicle. The intelligent work vehicle preheating system includes an electric drive subsystem containing a battery pack, a hydraulic subsystem containing a first HF heating device, and a first HF temperature sensor configured to monitor a current temperature of a first hydraulic fluid body within the hydraulic subsystem. A computer-readable memory stores a first minimum target temperature at or above which the first hydraulic fluid body is desirably maintained during operation of the E/H work vehicle. A controller architecture is coupled to the electric drive subsystem, to the HF heating device, to the first HF temperature sensor, and to the computer-readable memory. The controller architecture is configured to selectively place the intelligent work vehicle preheating system in an off-duty preheat mode when the electric drive subsystem is connected to an external power supply utilized to charge the battery pack. The controller architecture further controls the HF heating device to heat the first hydraulic fluid body when (i) the intelligent work vehicle preheating system is placed in the off-duty preheat mode, and (ii) the current temperature of the first hydraulic fluid body is less than the first minimum target temperature.

2. The intelligent work vehicle preheating system of example 1, wherein the hydraulic subsystem further includes a hydraulic flow circuit containing the first a hydraulic fluid body, as well as at least one hydraulic actuator fluidly coupled to the hydraulic flow circuit and controllable to move an implement of the E/H work vehicle.

3. The intelligent work vehicle preheating system of example 2, wherein the at least one hydraulic actuator assumes the form of a hydraulic cylinder controllable to move a front end loader assembly of the E/H work vehicle.

4. The intelligent work vehicle preheating system of example 2, wherein the at least one hydraulic actuator assumes the form of a hydraulic motor.

5. The intelligent work vehicle preheating system of example 1, wherein the hydraulic subsystem includes a hydraulic flow circuit containing the first hydraulic fluid body, an actively-lubricated axle assembly fluidly coupled to the hydraulic flow circuit, and a hydraulic pump positioned in the hydraulic flow circuit and, when driven, urging lubricant flow through the actively-lubricated axle assembly during operation of the E/H work vehicle.

6. The intelligent work vehicle preheating system of example 1, wherein hydraulic subsystem includes a hydraulic flow circuit containing the first hydraulic fluid body, an actively-lubricated drivetrain gearbox fluid coupled in the hydraulic flow circuit, and a hydraulic pump positioned in the hydraulic flow circuit. When driven, the hydraulic pump urges lubricant flow through the actively-lubricated drivetrain gearbox during operation of the E/H work vehicle.

7. The intelligent work vehicle preheating system of example 1, further including a cabin temperature sensor coupled to the controller architecture and configured to monitor a current temperature within a cabin of the E/H work vehicle, and a cabin heating device coupled to the controller architecture and controllable to warm airflow supplied to the cabin. The controller architecture is further configured to control the cabin heating device to warm airflow supplied to the cabin when the intelligent work vehicle preheating system is placed in the off-duty preheat mode and the current temperature of the cabin is less than a minimum cabin target temperature stored in the computer-readable memory.

8. The intelligent work vehicle preheating system of example 7, wherein the controller architecture is configured to control the cabin heating device to heat airflow supplied to the cabin concurrently with heating the first hydraulic fluid body when the a intelligent work vehicle preheating system is placed in the off-duty preheat mode.

9. The intelligent work vehicle preheating system of example 1, wherein the first minimum target temperature is equal to or greater than 60 degrees Celsius, while the hydraulic subsystem has a hydraulic fluid capacity exceeding 110 liters.

10. The intelligent work vehicle preheating system of example 1, wherein the controller architecture is further configured to: (i) establish an earliest anticipated start time at which on-duty usage of the E/H work vehicle is expected to recommence; and (ii) placing the intelligent work vehicle preheating system in the off-duty preheat mode at a time of day providing a sufficient duration of time to charge the battery pack to a minimum target state of charge prior to the earliest anticipated start time.

11. The intelligent work vehicle preheating system of example 10, wherein the controller architecture is further configured to establish an earliest anticipated start time based upon user input entered via an operator interface of the E/H work vehicle.

12. The intelligent work vehicle preheating system of example 1, wherein the controller architecture is further configured to: (i) monitor a current SoC of the battery pack; and (ii) refrain from heating the first hydraulic fluid body when the current temperature of the first hydraulic fluid body is less than the first minimum target temperature until the current SoC of the battery pack surpasses a minimum SoC threshold stored in the computer-readable memory.

13. The intelligent work vehicle preheating system of example 1, further including a first vehicle-side charging terminal configured to supply current to the electrical drive subsystem when connected to the external power supply; and a second vehicle-side charging terminal configured to supply current to the HF heating device, while bypassing the electrical drive subsystem when connected to the external power supply.

14. The intelligent work vehicle preheating system of example 1, wherein the controller architecture is configured to return to a default mode of operation when detecting that a connection between the electric drive subsystem and the external power supply has been terminated.

15. The intelligent work vehicle preheating system of example 1, further a including a second HF temperature sensor coupled to the controller architecture and configured to monitor a current temperature of a second hydraulic fluid body within the hydraulic subsystem, while the hydraulic subsystem further contains a second HF heating device coupled to the controller architecture. The controller architecture is further configured to control the second HF heating device to heat the second hydraulic fluid body when the current temperature of the second hydraulic fluid body is less than a second minimum target temperature stored in the computer-readable memory, the second minimum target temperature greater than the first minimum target temperature.

CONCLUSION

The foregoing has thus disclosed embodiments of systems and methods utilized in conjunction with E/H construction vehicles and other E/H work vehicles, which perform certain, strategically-applied preheating functions to better preserve battery energy stores in advance of on-duty usage of a given E/H work vehicle. Embodiments of the intelligent work vehicle preheating system may heat any number of hydraulic fluid bodies, whether utilized for actuation or lubrication purposes, to the same or different, tailored temperature when operating in an off-duty preheat mode. So too may the cabin of the E/H work vehicle may be preheated to operator comfort levels when the intelligent work vehicle preheating system operates in the off-duty preheat mode. Varying levels of intelligence may also be applied to, for example, constrain operation in the intelligent preheat mode to consider schedule-based concerns or to ensure that the work vehicle battery pack is adequately charged prior to commencing preheating functions. Through the provision of such intelligent preheating functions, optimal operation of the work vehicle hydraulic system can commence immediately upon disconnection of the host E/H work vehicle from an external power supply, while the need to expend valuable battery energy stores to rapidly ramp up hydraulic fluid (and possibly cabin) heating is mitigated to effectively extend the operational lifespan of the battery during ensuring on-duty usage of work vehicle.

Finally, as used herein, the singular forms "a", "an," and "the" are intentionally-grown to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An intelligent work vehicle preheating system onboard an electric-hydraulic (E/H) work vehicle, the intelligent work vehicle preheating system comprising:
   an electric drive subsystem containing a battery pack; and
   a controller architecture coupled to the electric drive subsystem and having a computer-readable memory storing a minimum target temperature at or above which a hydraulic fluid body is maintained during operation of the E/H work vehicle, the controller architecture configured to:
   selectively place the intelligent work vehicle preheating system in an off-duty preheat mode when the electric drive subsystem is connected to an external power supply utilized to charge the battery pack; and
   control heating of the hydraulic fluid body when (i) the intelligent work vehicle preheating system is placed in the off-duty preheat mode, and (ii) a current temperature of the hydraulic fluid body is less than the minimum target temperature.

2. The intelligent work vehicle preheating system of claim 1, further comprising:
   a hydraulic subsystem containing a hydraulic fluid (HF) heating device; and
   an HF temperature sensor configured to monitor the current temperature of the hydraulic fluid body within the hydraulic subsystem;
   wherein the control architecture is coupled to the HF heating device and the HF temperature sensor and configured to control heating of the HF heating device based on the HF temperature sensor.

3. The intelligent work vehicle preheating system of claim 2, further comprising:
   a vehicle-side charging terminal configured to supply current to the electrical drive subsystem when connected to the external power supply; and
   a second vehicle-side charging terminal configured to supply current to the HF heating device, while bypassing the electrical drive subsystem when connected to the external power supply.

4. The intelligent work vehicle preheating system of claim 2, further comprising a second HF temperature sensor coupled to the controller architecture and configured to monitor a current temperature of a second hydraulic fluid body within the hydraulic subsystem;
   wherein the hydraulic subsystem further contains a second HF heating device coupled to the controller architecture; and
   wherein the controller architecture is further configured to control the second HF heating device to heat the second hydraulic fluid body when the current temperature of the second hydraulic fluid body is less than a second minimum target temperature stored in the computer-readable memory, the second minimum target temperature greater than the minimum target temperature.

5. The intelligent work vehicle preheating system of claim 2, wherein the hydraulic subsystem comprises:

a recirculation loop in which the HF heating device is positioned; and a recirculation pump coupled to the controller architecture and further positioned in the recirculation loop;

wherein the controller architecture is further configured to operate the recirculation pump to circulate at least a portion of the hydraulic fluid body about the recirculation loop when controlling the HF heating device to heat the hydraulic fluid body.

6. The intelligent work vehicle preheating system of claim 1, further comprising:

a cabin temperature sensor coupled to the controller architecture and configured to monitor a current temperature within a cabin of the E/H work vehicle; and a cabin heating device coupled to the controller architecture and controllable to warm airflow supplied to the cabin;

wherein the controller architecture is further configured to control the cabin heating device to warm airflow supplied to the cabin when the intelligent work vehicle preheating system is placed in the off-duty preheat mode and the current temperature of the cabin is less than a minimum cabin target temperature stored in the computer-readable memory.

7. The intelligent work vehicle preheating system of claim 6, wherein the controller architecture is configured to control the cabin heating device to heat airflow supplied to the cabin concurrently with heating the hydraulic fluid body when the intelligent work vehicle preheating system is placed in the off-duty preheat mode.

8. The intelligent work vehicle preheating system of claim 1, wherein the controller architecture is further configured to:

establish an earliest anticipated start time at which on-duty usage of the E/H work vehicle is expected to recommence; and place the intelligent work vehicle preheating system in the off-duty preheat mode at a time of day providing a sufficient duration of time to charge the battery pack to a minimum target state of charge prior to the earliest anticipated start time.

9. The intelligent work vehicle preheating system of claim 8, wherein the controller architecture is further configured to establish an earliest anticipated start time based upon user input entered via an operator interface of the E/H work vehicle.

10. The intelligent work vehicle preheating system of claim 1, wherein the controller architecture is further configured to:

monitor a current state of charge (SoC) of the battery pack; and refrain from heating the hydraulic fluid body when the current temperature of the hydraulic fluid body is less than the minimum target temperature until the current SoC of the battery pack surpasses a minimum SoC threshold stored in the computer-readable memory.

11. An intelligent work vehicle preheating system onboard an electric-hydraulic (E/H) work vehicle, the intelligent work vehicle preheating system comprising:

an electric drive subsystem containing a battery pack;

a hydraulic subsystem containing a hydraulic fluid body;

a hydraulic fluid (HF) temperature sensor configured to monitor a current temperature of the hydraulic fluid body within the hydraulic subsystem;

a computer-readable memory storing a minimum target temperature at or above which the hydraulic fluid body is maintained during operation of the E/H work vehicle; and a controller architecture coupled to the electric drive subsystem, to the HF temperature sensor, and to the computer-readable memory, the controller architecture configured to:

selectively place the intelligent work vehicle preheating system in an off-duty preheat mode when the electric drive subsystem is connected to an external power supply utilized to charge the battery pack; and control heating of the hydraulic fluid body when (i) the intelligent work vehicle preheating system is placed in the off-duty preheat mode, and (ii) the current temperature of the hydraulic fluid body is less than the minimum target temperature.

12. The intelligent work vehicle preheating system of claim 11, wherein the hydraulic subsystem includes an HF heating device;

wherein the control architecture is coupled to the HF heating device and the HF temperature sensor and configured to control heating of the HF heating device based on the HF temperature sensor.

13. The intelligent work vehicle preheating system of claim 12, wherein the hydraulic subsystem comprises:

a recirculation loop in which the HF heating device is positioned; and a recirculation pump coupled to the controller architecture and further positioned in the recirculation loop;

wherein the controller architecture is further configured to operate the recirculation pump to circulate at least a portion of the hydraulic fluid body about the recirculation loop when controlling the HF heating device to heat the hydraulic fluid body.

14. The intelligent work vehicle preheating system of claim 12, further comprising:

a cabin temperature sensor coupled to the controller architecture and configured to monitor a current temperature within a cabin of the E/H work vehicle; and a cabin heating device coupled to the controller architecture and controllable to warm airflow supplied to the cabin;

wherein the controller architecture is further configured to control the cabin heating device to warm airflow supplied to the cabin when the intelligent work vehicle preheating system is placed in the off-duty preheat mode and the current temperature of the cabin is less than a minimum cabin target temperature stored in the computer-readable memory.

15. The intelligent work vehicle preheating system of claim 14, wherein the controller architecture is configured to control the cabin heating device to heat airflow supplied to the cabin concurrently with heating the hydraulic fluid body when the intelligent work vehicle preheating system is placed in the off-duty preheat mode.

16. The intelligent work vehicle preheating system of claim 11, wherein the controller architecture is further configured to:

monitor a current state of charge (SoC) of the battery pack; and refrain from heating the hydraulic fluid body when the current temperature of the hydraulic fluid body is less than the minimum target temperature until the current SoC of the battery pack surpasses a minimum SoC threshold stored in the computer-readable memory.

17. An intelligent work vehicle preheating system onboard an electric-hydraulic (E/H) work vehicle, the intelligent work vehicle preheating system comprising:

an electric drive subsystem containing a battery pack;

a cabin temperature sensor configured to monitor a current temperature within a cabin of the E/H work vehicle; and a cabin heating device coupled to the controller architecture and controllable to warm airflow supplied to the cabin;

a computer-readable memory storing a minimum cabin target temperature at or above which the cabin is maintained during operation of the E/H work vehicle; and a controller architecture coupled to the electric drive subsystem, to the cabin heating device, to the cabin temperature sensor, and to the computer-readable memory, the controller architecture configured to:

selectively place the intelligent work vehicle preheating system in an off-duty preheat mode when the electric drive subsystem is connected to an external power supply utilized to charge the battery pack; and control the cabin heating device to warm airflow supplied to the cabin when the intelligent work vehicle preheating system is placed in the off-duty preheat mode and the current temperature of the cabin is less than the minimum cabin target temperature stored in the computer-readable memory.

18. The intelligent work vehicle preheating system of claim 17, further comprising:

a hydraulic subsystem containing a hydraulic fluid (HF) heating device; and an HF temperature sensor configured to monitor a current temperature of a hydraulic fluid body within the hydraulic subsystem;

wherein the control architecture is coupled to the HF heating device and the HF temperature sensor; and wherein the computer-readable memory stores a minimum target temperature at or above which the hydraulic fluid body is maintained during operation of the E/H work vehicle.

19. The intelligent work vehicle preheating system of claim 18, wherein the control architecture is configured to control heating of the HF heating device based on the HF temperature sensor to control heating of the hydraulic fluid body when (i) the intelligent work vehicle preheating system is placed in the off-duty preheat mode, and (ii) the current temperature of the hydraulic fluid body is less than the minimum target temperature.

20. The intelligent work vehicle preheating system of claim 19, wherein the controller architecture is configured to control the cabin heating device to heat airflow supplied to the cabin concurrently with heating the hydraulic fluid body when the intelligent work vehicle preheating system is placed in the off-duty preheat mode.

21. An intelligent work vehicle preheating system onboard an electric-hydraulic (E/H) work vehicle, the intelligent work vehicle preheating system comprising:

an electric drive subsystem containing a battery pack;

a temperature sensor configured to sense a current temperature of a fluid of the E/H work vehicle; and a controller architecture coupled to the electric drive subsystem and the temperature sensor and having a computer-readable memory storing a minimum target temperature at or above which the fluid of the E/H work vehicle is maintained during operation and storing a minimum SoC threshold at or above which the battery may be utilized for pre-heating the fluid of the E/H work vehicle, the controller architecture configured to:

monitor a current state of charge (SoC) of the battery pack;

monitor when the battery pack is connected to an external power supply; and command heating of the fluid of the E/H work vehicle when the battery pack is connected to the external power supply and the current temperature of the fluid of the E/H work vehicle is less than the minimum target temperature and the current SoC is more than the minimum SoC threshold.

22. The intelligent work vehicle preheating system of claim 21, further comprising a hydraulic subsystem containing a hydraulic fluid (HF) heating device;

wherein the temperature sensor is an HF temperature sensor configured to monitor the current temperature of the hydraulic fluid body within the hydraulic subsystem;

wherein the control architecture is coupled to the HF heating device and the HF temperature sensor and configured to control heating of the HF heating device based on the HF temperature sensor.

23. The intelligent work vehicle preheating system of claim 22, further comprising:

a vehicle-side charging terminal configured to supply current to the electrical drive subsystem when connected to the external power supply; and a second vehicle-side charging terminal configured to supply current to the HF heating device, while bypassing the electrical drive subsystem when connected to the external power supply.

24. The intelligent work vehicle preheating system of claim 22, further comprising a second HF temperature sensor coupled to the controller architecture and configured to monitor a current temperature of a second hydraulic fluid body within the hydraulic subsystem;

wherein the hydraulic subsystem further contains a second HF heating device coupled to the controller architecture; and wherein the controller architecture is further configured to control the second HF heating device to heat the second hydraulic fluid body when the current temperature of the second hydraulic fluid body is less than a second minimum target temperature stored in the computer-readable memory, the second minimum target temperature greater than the minimum target temperature.

25. The intelligent work vehicle preheating system of claim 22, wherein the hydraulic subsystem comprises:

a recirculation loop in which the HF heating device is positioned; and a recirculation pump coupled to the controller architecture and further positioned in the recirculation loop;

wherein the controller architecture is further configured to operate the recirculation pump to circulate at least a portion of the hydraulic fluid body about the recirculation loop when controlling the HF heating device to heat the hydraulic fluid body.

26. The intelligent work vehicle preheating system of claim 22, further comprising:

a cabin temperature sensor coupled to the controller architecture and configured to monitor a current temperature within a cabin of the E/H work vehicle; and a cabin heating device coupled to the controller architecture and controllable to warm airflow supplied to the cabin;

wherein the controller architecture is further configured to control the cabin heating device to warm airflow supplied to the cabin when the when the battery pack is connected to the external power supply and the current temperature of the cabin is less than a minimum cabin target temperature stored in the computer-readable memory.

27. The intelligent work vehicle preheating system of claim 26, wherein the controller architecture is configured to control the cabin heating device to heat airflow supplied to the cabin concurrently with heating the hydraulic fluid body.

28. The intelligent work vehicle preheating system of claim 22, wherein the controller architecture is further configured to refrain from heating the hydraulic fluid body when the current temperature of the hydraulic fluid body is less than the minimum target temperature until the current SoC of the battery pack surpasses the minimum SoC threshold stored in the computer-readable memory.

\* \* \* \* \*